United States Patent
Pliss et al.

(10) Patent No.: US 7,424,589 B1
(45) Date of Patent: Sep. 9, 2008

(54) METHOD AND AN APPARATUS FOR THE HIGH-PRECISION TRACKING OF APPROXIMATE PER-TASK MEMORY USAGE

(75) Inventors: Oleg A. Pliss, Santa Clara, CA (US); Bernd J. W. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 363 days.

(21) Appl. No.: 11/165,807

(22) Filed: Jun. 24, 2005

(51) Int. Cl.
*G06F 12/00* (2006.01)
*G06F 9/50* (2006.01)

(52) U.S. Cl. ............... 711/170; 711/153; 711/159; 707/206; 718/107; 718/108

(58) Field of Classification Search ............ 711/153, 711/159, 170; 702/206
See application file for complete search history.

(56) References Cited

U.S. PATENT DOCUMENTS

| | | | |
|---|---|---|---|
| 6,199,075 B1 * | 3/2001 | Ungar et al. | 707/206 |
| 6,560,773 B1 * | 5/2003 | Alexander et al. | 717/128 |
| 7,171,527 B2 * | 1/2007 | Pliss et al. | 711/153 |
| 2001/0023478 A1 * | 9/2001 | Ozawa et al. | 711/170 |
| 2003/0220952 A1 * | 11/2003 | Borman et al. | 707/206 |
| 2005/0262324 A1 * | 11/2005 | Mathiske | 711/170 |

* cited by examiner

*Primary Examiner*—Matt Kim
*Assistant Examiner*—Michael C Krofcheck
(74) *Attorney, Agent, or Firm*—Park, Vaughan & Fleming LLP

(57) ABSTRACT

One embodiment of the present invention provides a method and a system for tracking memory usage of tasks in a shared heap. The system performs a full garbage-collection operation on the shared heap, during which a base memory usage is determined for each task. The system then periodically samples task state during execution to generate an estimate of newly allocated memory for each task. The base memory usage and the estimate of newly allocated memory for each task are combined to produce an estimate of current memory usage for each task. This estimate of current memory usage is used to determine whether a task is likely to be violating a memory quota. If so, the system triggers a remedial action, which can include: a full garbage-collection operation; a generational garbage-collection operation; or generation of a signal which indicates that a memory quota violation has occurred.

17 Claims, 5 Drawing Sheets

METHOD AND AN APPARATUS FOR THE HIGH-PRECISION TRACKING OF APPROXIMATE PER-TASK MEMORY USAGE

BACKGROUND

1. Field of the Invention

The present invention relates to virtual machines within computer systems. More specifically, the present invention relates to a method and an apparatus for keeping track of memory usage for tasks in a shared heap in order to control consumption of memory resources.

2. Related Art

The JAVA 2 Platform, Micro Edition (J2ME™) (The terms JAVA™, JVM™, and JAVA VIRTUAL MACHINE™ are trademarks of SUN Microsystems Inc. of Santa Clara, Calif.), has become a very popular software platform for memory-constrained devices such as wireless devices. Motorola, Nokia, NTT DoCoMo, RIM, Siemens, and many other key players in the wireless device industry have shipped a large number of J2ME-enabled devices. In fact, based on some estimates, over 200 million J2ME-enabled mobile phones were shipped in 2003 alone.

A number of techniques to conserve memory have been developed to effectively run applications on such memory-constrained computing devices. One promising technique uses a shared heap to store objects from different tasks (or threads). This technique makes better use of memory space than the conventional technique, which uses a separate heap for each task. However, using a shared heap complicates both garbage-collection and memory-accounting operations.

In computing systems that do not have such memory constraints, data structures such as lookup tables can be used to keep track of per-task memory allocation. However, in memory-constrained computing devices, the high overhead required by such data structures and techniques largely eliminates the space savings gained by using a shared heap.

Hence, what is needed is a method and an apparatus for keeping track of memory usage for tasks in a shared heap without the above-described problems.

SUMMARY

One embodiment of the present invention provides a method and a system for tracking memory usage of tasks in a shared heap. The system performs a full garbage-collection operation on the shared heap, during which a base memory usage is determined for each task. The system then periodically samples task state during execution to generate an estimate of newly allocated memory for each task. The base memory usage and the estimate of newly allocated memory for each task are combined to produce an estimate of current memory usage for each task. This estimate of current memory usage is used to determine whether a task is likely to be violating a memory quota. If so, the system triggers a remedial action, which can include: a full garbage-collection operation; a generational garbage-collection operation; or generation of a signal which indicates that a memory quota violation has occurred.

In a variation on this embodiment, an allocation point is maintained that identifies the next location from which memory will be allocated to a task. This allocation point is advanced as memory is allocated. An initial allocation point is remembered after switching to the task. After a time interval, a subsequent allocation point is remembered. An estimate of newly allocated memory for the task is determined based on the initial allocation point and the subsequent allocation point. In a further variation, the subsequent allocation point is remembered by storing the subsequent allocation point when the time-slice of the task is switched.

In a variation on this embodiment, a generational garbage-collection operation is performed on the shared heap. This generational garbage-collection operation analyzes new objects of a task which have been allocated on the shared heap since the last full garbage collection. During the generational garbage-collection operation, the system determines an estimate of the memory allocated to each task since the last full garbage-collection operation. The combination of the base memory usage, the estimate of the memory allocated since the last full garbage-collection operation, and the estimate of newly allocated memory can be used to compute an estimate of current memory usage for each task.

In a variation on this embodiment, additional generational garbage-collection operations are run on the shared heap. As a result, the total memory used by the task is split across memory regions associated with different garbage-collection runs. A set of per-task memory counters is maintained, wherein a memory counter stores the amount of memory used by the task's allocated objects in a memory region that has been compacted by a garbage-collection run.

In a variation on this embodiment, the tasks run on a multi-processor system.

In a variation on this embodiment, the shared heap is located within a memory-constrained computing device.

In a variation on this embodiment, the shared heap is located within a platform-independent virtual machine.

In a further variation on this embodiment, the platform-independent virtual machine is a JAVA VIRTUAL MACHINE™.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium or embodied in a transmission medium as computer instruction signals. The computer-readable storage medium may be any device or medium that can store code and/or data for use by a computer system. This includes, but is not limited to, magnetic and optical storage devices such as disk drives, magnetic tape, CDs (compact discs) and DVDs (digital versatile discs or digital video discs). The transmission medium (with or without a carrier wave upon which the signals are modulated) may include a communications network such as the Internet and computer instruction signals embodied in a transmission medium.

Memory-Constrained Computing Device with a Shared Heap

Figure 1:
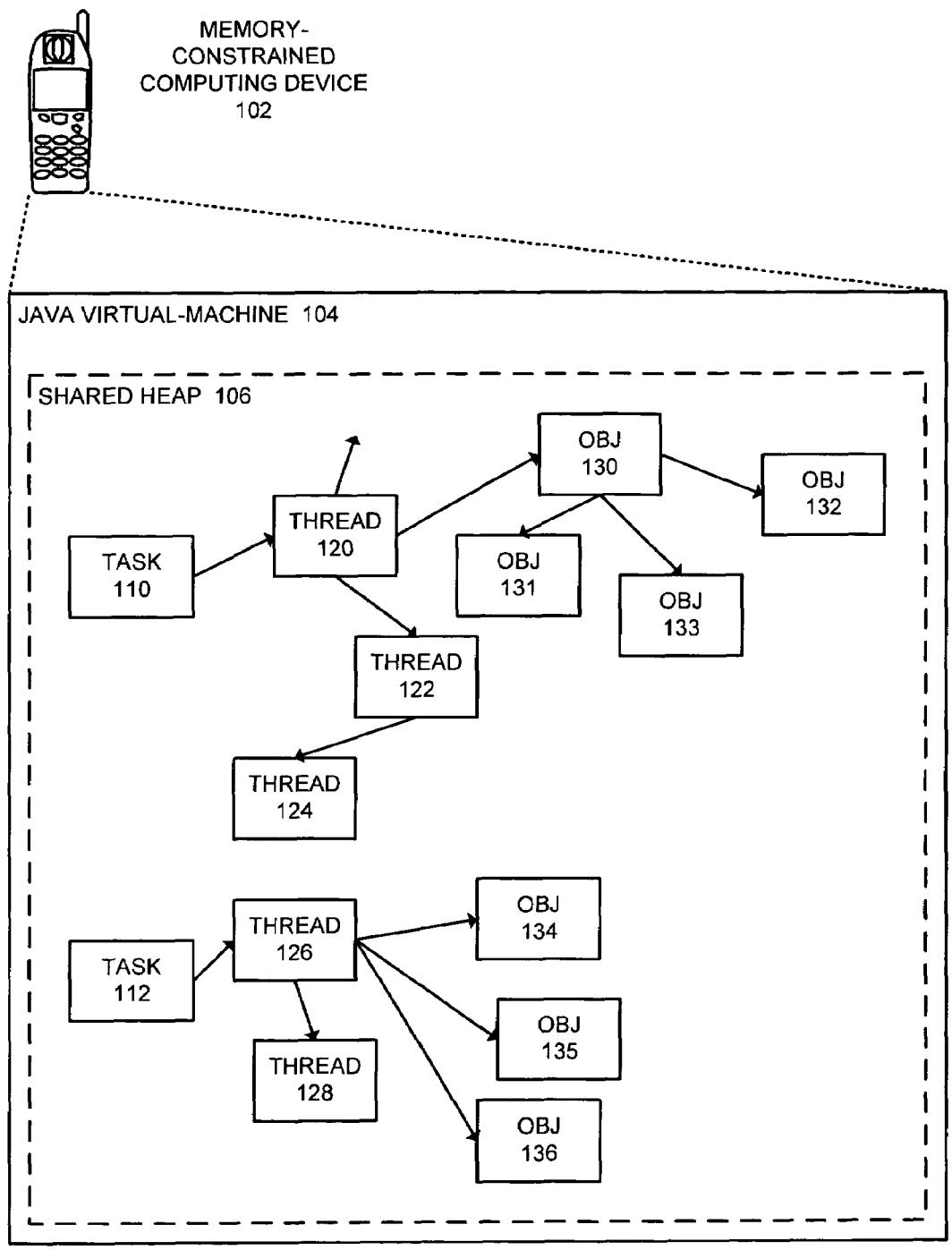
FIG. 1 illustrates a memory-constrained computing device with a shared heap in accordance with an embodiment of the present invention.

FIG. 1 illustrates a memory-constrained computing device 102 with a shared heap in accordance with an embodiment of the present invention. Memory-constrained computing device 102 can include any type of computing device, including, but not limited to, a cell phone, a computer system based on a microprocessor, a digital signal processor, a portable computing device, a personal organizer, a device controller, and a computational engine within an appliance. Memory-constrained computing device 102 contains JAVA VIRTUAL MACHINE™ (hereinafter referred to as "JVM") 104, which in turn contains shared heap 106. (The terms JAVA™, JVM™, and JAVA VIRTUAL MACHINE™ are trademarks of SUN Microsystems, Inc. of Santa Clara, Calif.) Note that JVM 104 could be any type of platform-independent virtual machine, and is not meant to be limited to a JAVA VIRTUAL MACHINE™.

Shared heap 106 includes all of the tasks running on JVM 104, as well as the associated threads and objects. For example, in the illustrated embodiment, shared heap 106 includes task 110, and associated threads 120-124. Likewise, shared heap 106 also includes task 112, and associated threads 126-128. In addition, shared heap 106 includes objects 130-136 that are associated with the various threads.

Generational Shared Heap

Figure 2:
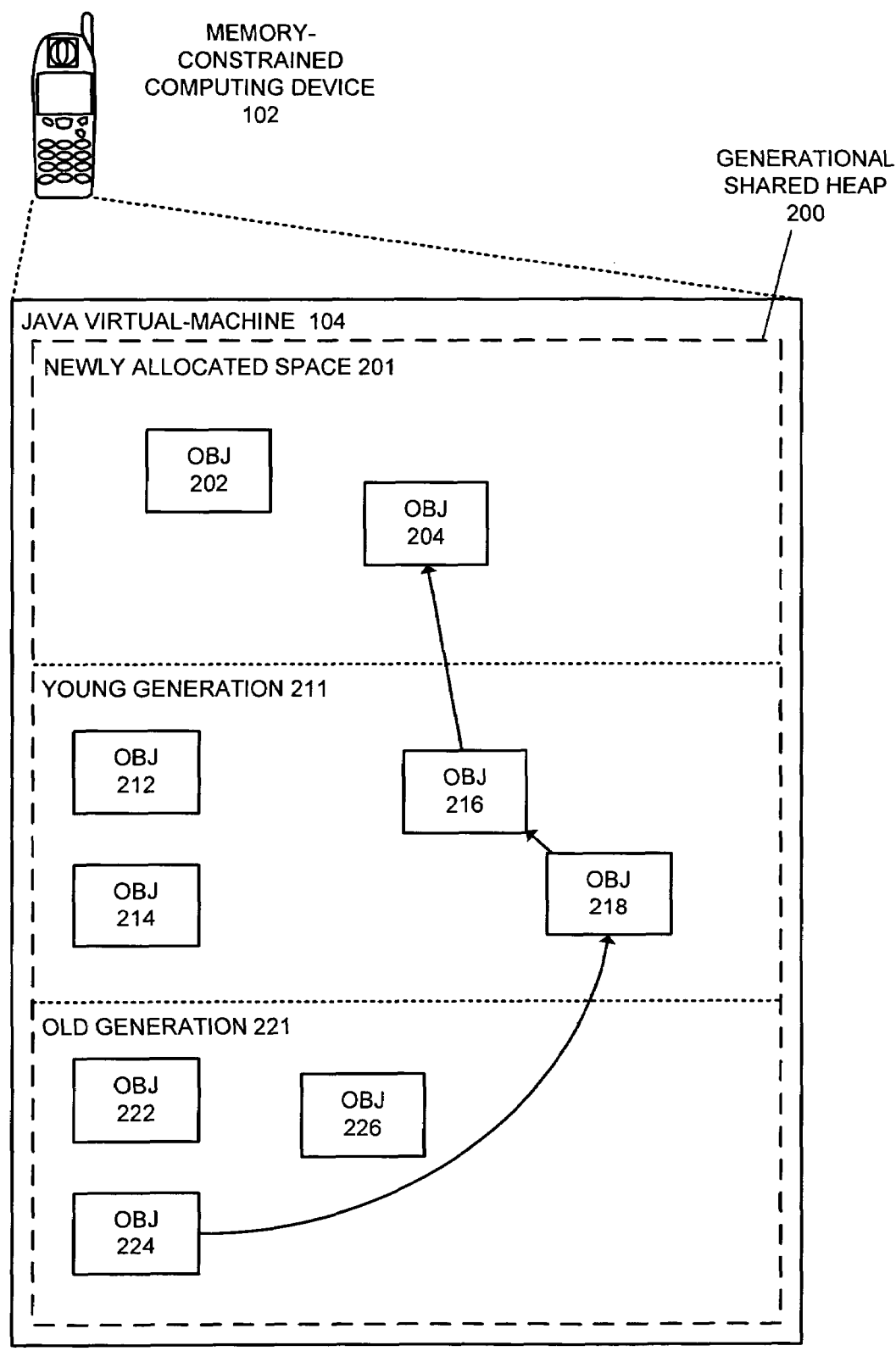
FIG. 2 illustrates a generational shared heap at a point in time between garbage-collection operations in accordance with an embodiment of the present invention.

FIG. 2 illustrates a generational shared heap 200 at a point in time between garbage-collection operations in accordance with an embodiment of the present invention. Note that generational shared heap 200 is partitioned into a newly allocated space 201, a young generation 211, and an old generation 221. In the example illustrated in FIG. 2, generational shared heap 200 is partitioned into three logical generations. However, generational shared heap 200 may be partitioned into any number of generations.

As objects are allocated to generational shared heap 200, they are allocated in newly allocated space 201. During subsequent generational garbage-collection operations, live objects in newly allocated space 201, such as objects 202-204, are promoted to young generation 211, and newly allocated space 201 is available for subsequent allocation operations. Additionally, pointers that point to the objects that are being promoted need to be updated, such as object 216.

Occasionally, it becomes necessary to perform a full garbage-collection operation, including old generation 221, to free space occupied by objects that are no longer live. During such operations, live objects in newly allocated space 201 (objects 202-204) and young generation 211 (objects 212-218) are promoted to old generation 221. Additionally, pointers that point to the objects that are being promoted need to be updated, such as object 224. Young generation 211 is removed after such an operation, and newly allocated space 201 is available for subsequent allocation operations. Note that various techniques for garbage collection exist. Any of these techniques, generational or not, can be used with the present invention.

Resource Usage Accounting

In a virtual machine with several tasks sharing the same object heap, a determination of heap occupancy by each individual task is needed to control consumption of memory resources. A full garbage collection can accurately assess the actual consumption, but it is a costly operation that cannot be run frequently. Incrementing a counter on the allocation of every new object also results in an accurate assessment, but impacts program performance by drastically increasing the cost of the frequent memory allocation operation. The present invention is able to assess memory usage per task between garbage-collection operations without much overhead by sampling allocation state and incrementally summarizing memory usage.

Figure 3:
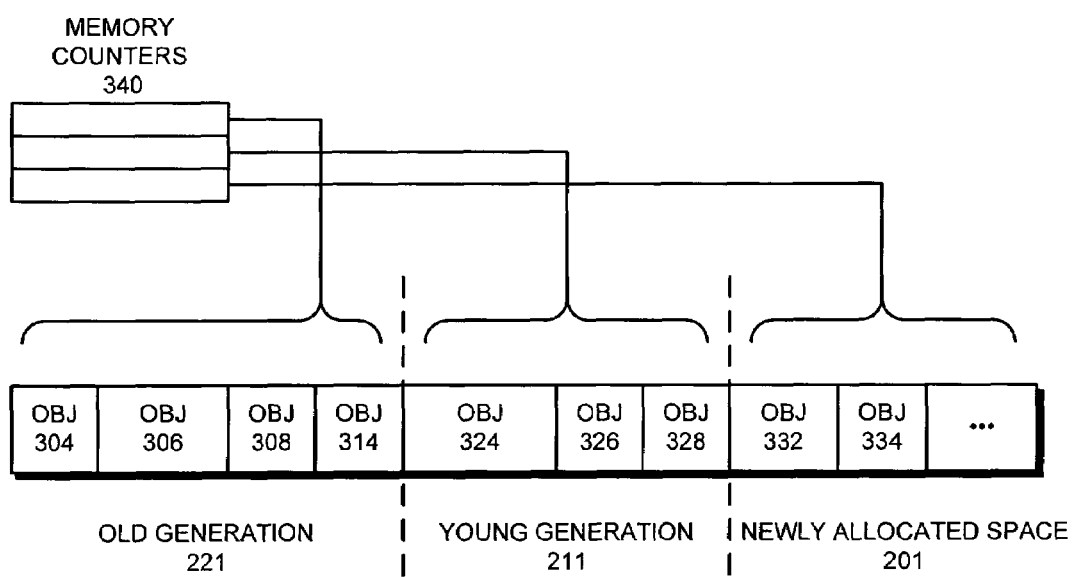
FIG. 3 illustrates memory counters that track the memory usage of generations of objects in accordance with an embodiment of the present invention.

FIG. 3 illustrates memory counters 340 that track the memory usage of generations of objects in accordance with an embodiment of the present invention. A separate memory counter is kept for each region that has been garbage-collected separately. For instance, in the case of a generational garbage collection, the amount of memory used for each task in each generation is stored.

Figure 4:
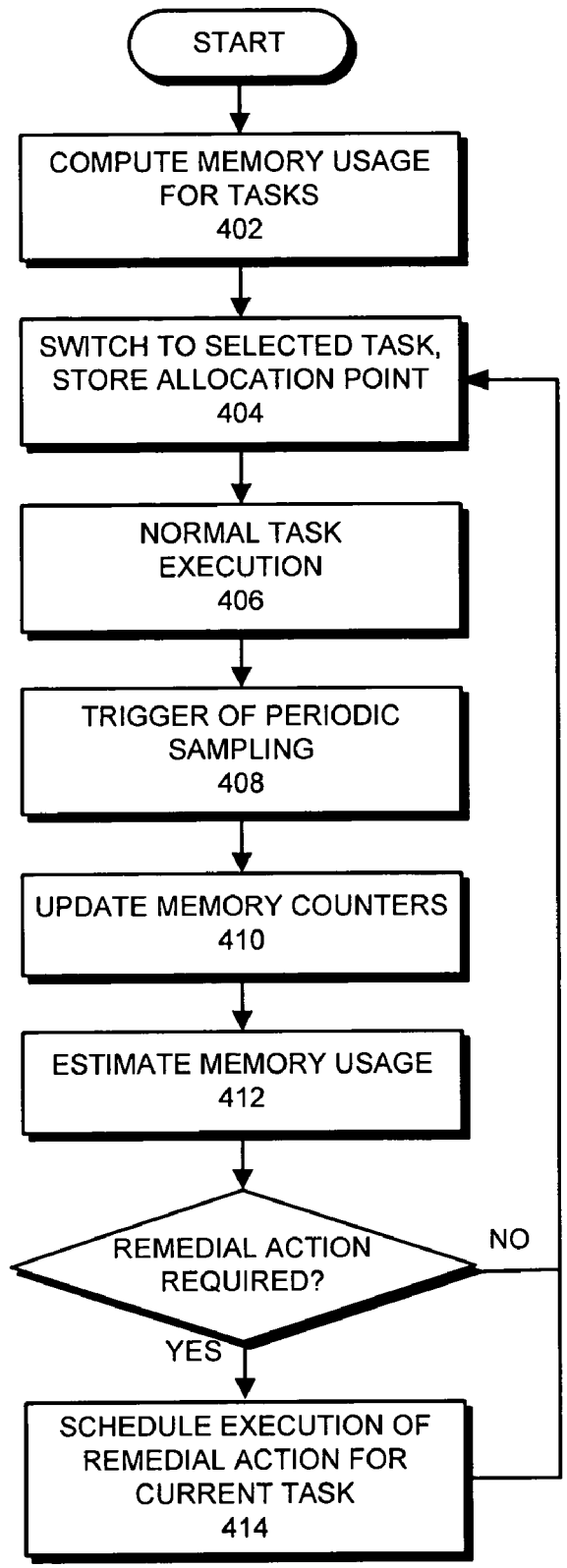
FIG. 4 presents a flowchart illustrating the process of resource usage accounting in accordance with an embodiment of the present invention.

FIG. 4 presents a flowchart illustrating the process of resource usage accounting in accordance with an embodiment of the present invention. The system begins tracking memory from a known state, for instance after the run of a full garbage collection. At this point, it is possible to compute precisely a base memory usage for each task (step 402).

Beginning after a task switch (step 404), the system remembers the allocation point, the point from which the next memory block will be allocated to the task. After this, the task proceeds to execute normally (step 406).

After some time interval, a periodic sampling of task state is triggered (step 408). The prompt for such a trigger could include but is not limited to a call from the program itself, inclusion by the compiler, the detection of a long or slow operation by the system, a system call, and a task switch.

Upon the receipt of such a trigger, the system determines the amount of memory allocated during the given task's time slice, and updates the memory counters (step 410). In the case of a "pointer-bumping" memory allocator, this would require only a simple subtraction and a guarantee that sampling must occur at minimum every time a task is switched out. Other heap designs and memory allocators, for instance a design that uses boundary objects or allocates from a linked list of free memory objects, might require different ways of calculating their equivalent usage estimates, but would still be covered by the present invention.

In the case of a segregated-free-lists memory allocator, new memory allocation can be tracked by enumerating free objects in every list. An object number is stored in each object. Allocation position is determined using an array of numbers of first objects in the lists. The number of allocated objects in a list is the difference between the current and stored number of the first object modulo the object number precision. Since all objects in each free list are of the same size, the amount of memory allocated from the lists is the object size for the list multiplied by the number of allocated objects from the list. The amount of allocated memory used to update the memory counters is the sum of memory allocated from all of the lists. Since the garbage collector inserts reclaimed objects into the beginning of the list in an arbitrary order, the reclaimed objects must be renumerated to keep the ordering of the list.

After the information in the memory counters has been updated, the base memory usage, any generational memory usage, and the estimate from the last time slice are combined to give a total estimate of memory usage for the task (step 412). If the total exceeds the task's memory quota, an escalation process begins to determine whether a remedial action is required. If so, a remedial action is scheduled to execute for the current task (step 414). Since sampling can occur at any moment of program execution, immediate execution of a remedial action might violate language semantics. As a result, the execution of remedial actions may be postponed until a more appropriate moment.

Note that tasks can run in a shared heap on a single- or multi-processor system. In the case of multi-processors, the processors do not require synchronization, and thus avoid a major performance bottleneck. An individual set of memory usage counters can be associated with each processor.

Remedial Actions

Figure 5:
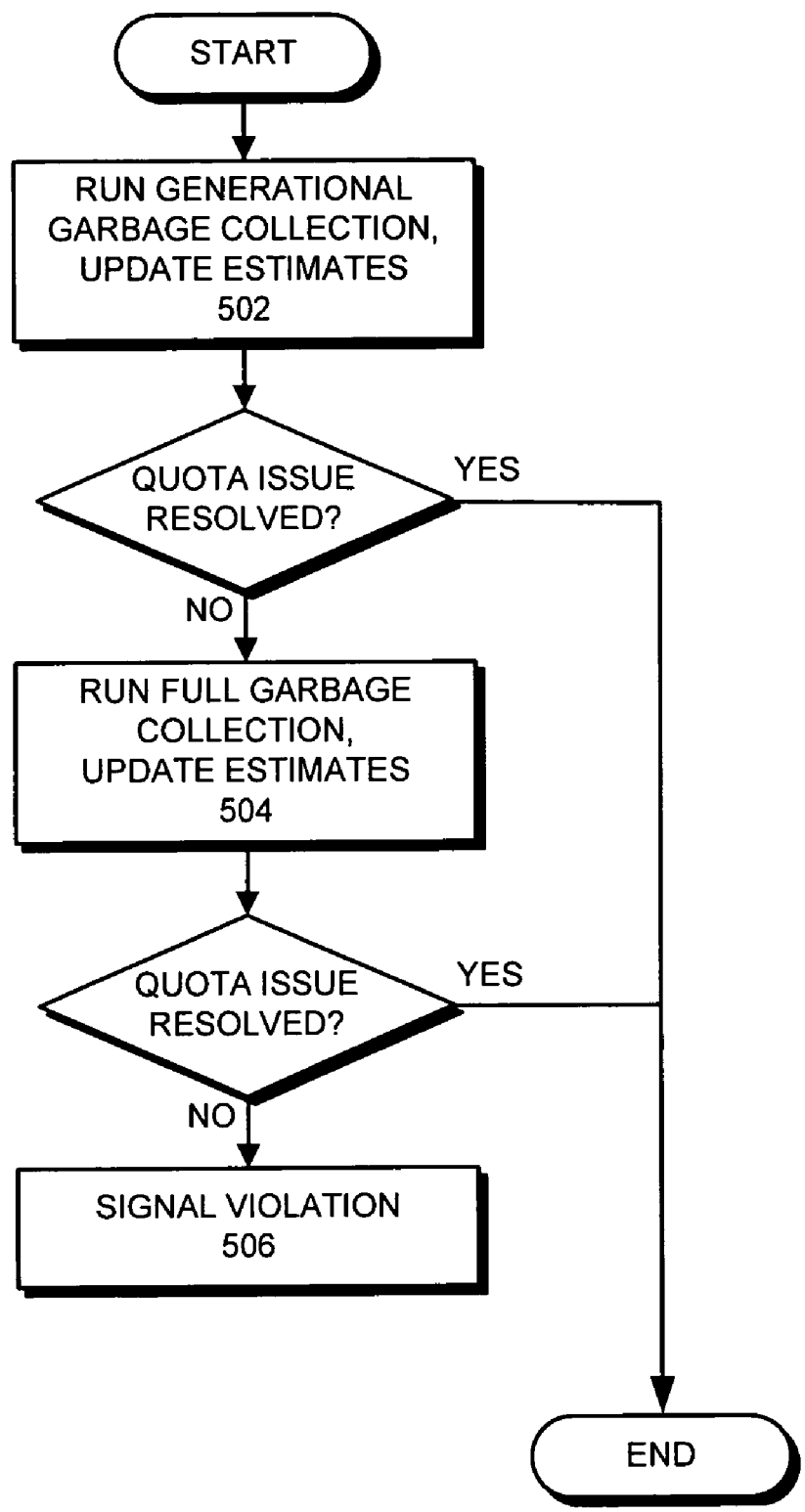
FIG. 5 presents a flowchart illustrating the process of performing remedial actions in accordance with an embodiment of the present invention.

FIG. 5 presents a flowchart illustrating a possible process for performing remedial actions in accordance with an embodiment of the present invention. The details of this process depend on the system in general and the respective garbage collection scheme, but could include a generational garbage-collection operation (step 502), a full garbage-collection operation (step 504), or the generation of a signal which indicates that a memory quota violation has occurred (step 506, e.g. an OutOfMemoryException in the case of a JVM).

In a multi-generational or otherwise segmented garbage collection system, only as much garbage collection needs to occur as is needed to free enough space to drop estimated memory consumption below the task's quota. For instance, a generational garbage-collection operation might free enough memory to allow the task to continue execution violation-free. Alternatively, if the generational garbage collection progresses and insufficient is freed, a full garbage collection could ultimately be required. After a generational garbage collection, only the counters associated with the young generation update. After a full garbage collection, all counters update. Only in the case that the full garbage collection fails will the task truly be found in violation of its quota.

This invention benefits from the ability to detect memory quota violation at the nearest task switch to its occurrence, as opposed to the nearest garbage collection time. Capitalizing on knowledge of newly allocated memory provides a more accurate quota mechanism compared to previous schemes that estimated the usage of relatively mature memory.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for tracking memory usage of tasks in a shared heap, comprising:

performing a full garbage-collection operation on the shared heap, during which a base memory usage is determined for a task;

maintaining a memory allocation point for the shared heap, wherein the memory allocation point indicates a next location from which memory will be allocated to tasks;

advancing the memory allocation point as memory is allocated for tasks;

after switching to the task during a task context-switch, remembering a value associated with the memory allocation point as an initial allocation point;

during execution of the task, periodically estimating an amount of newly allocated memory for the task by calculating an interval between the initial allocation point and a subsequent allocation point for the shared heap, where the subsequent allocation point is associated with a subsequent location of the advancing memory allocation point;

combining the base memory usage and the estimate of newly allocated memory to determine an estimate of current memory usage for the task;

using the estimate of current memory usage to determine whether the task is likely to be violating a memory quota;

triggering a remedial action when the task violates the memory quota; and after the task has been switched out during a task context-switch and a subsequent task is switched in, remembering the current location of the advancing memory allocation point as an initial allocation point for the subsequent task;

wherein the current memory usage is estimated for the task at a finer time granularity than at every full and/or generational garbage-collection operation.

2. The method of claim 1, wherein remembering the subsequent allocation point involves storing the current location of the memory allocation point at the time the task is switched out during a task context-switch as the subsequent allocation point.

3. The method of claim 1, wherein the remedial action can include:

a full garbage-collection operation;

a generational garbage-collection operation; or generation of a signal which indicates that a memory quota violation has occurred.

4. The method of claim 1, wherein the method further comprises:

performing a generational garbage-collection operation on the shared heap, wherein the generational garbage-collection operation is performed on new objects of a task which have been allocated on the shared heap since the last full garbage collection;

during the generational garbage-collection operation, determining for each task an estimate of the memory allocated for the task since the last full garbage-collection operation; and combining the base memory usage, the estimate of the memory allocated since the last full garbage-collection operation, and the estimate of newly allocated memory to determine the estimate of current memory usage for each task.

5. The method of claim 4, wherein the method further comprises:

performing additional generational garbage-collection operations on the shared heap;

wherein the total memory used by the task is split across memory regions associated with different garbage-collection runs; and maintaining a set of per-task memory counters, wherein a memory counter stores the amount of memory used by the task's allocated objects in a memory region that has been compacted by a garbage-collection run.

6. The method of claim 1, wherein the tasks run on a multi-processor system.

7. The method of claim 1, wherein the shared heap is located within a memory-constrained computing device.

8. The method of claim 1, wherein the shared heap is located within a platform-independent virtual machine.

9. A computer-readable storage medium storing instructions that when executed by a computer cause the computer to perform a method for tracking memory usage of tasks in a shared heap, the method comprising:

performing a full garbage-collection operation on the shared heap, during which a base memory usage is determined for a task;

maintaining a memory allocation point for the shared heap, wherein the memory allocation point indicates a next location from which memory will be allocated to tasks;

advancing the memory allocation point as memory is allocated for tasks;

after switching to the task during a task context-switch, remembering a value associated with the memory allocation point as an initial allocation point;

during execution of the task, periodically estimating an amount of newly allocated memory for the task by calculating an interval between the initial allocation point and a subsequent allocation point for the shared heap, where the subsequent allocation point is associated with a subsequent location of the advancing memory allocation point;

combining the base memory usage and the estimate of newly allocated memory to determine an estimate of current memory usage for the task;

using the estimate of current memory usage to determine whether the task is likely to be violating a memory quota;

triggering a remedial action when the task violates the memory quota; and after the task has been switched out during a task context-switch and a subsequent task is switched in, remembering the current location of the advancing memory allocation point as an initial allocation point for the subsequent task;

wherein the current memory usage is estimated for the task at a finer time granularity than at every full and/or generational garbage-collection operation.

10. The computer-readable storage medium of claim 9, wherein remembering the subsequent allocation point involves storing the current location of the memory allocation point at the time the task is switched out during a task context-switch as the subsequent allocation point.

11. The computer-readable storage medium of claim 9, wherein the remedial action can include:
a full garbage-collection operation;
a generational garbage-collection operation; or
generation of a signal which indicates that a memory quota violation has occurred.

12. The computer-readable storage medium of claim 9, wherein the method further comprises:

performing a generational garbage-collection operation on the shared heap, wherein the generational garbage-collection operation is performed on new objects of a task which have been allocated on the shared heap since the last full garbage collection;

during the generational garbage-collection operation, determining for each task an estimate of the memory allocated for the task since the last full garbage-collection operation; and combining the base memory usage, the estimate of the memory allocated since the last full garbage-collection operation, and the estimate of newly allocated memory to determine the estimate of current memory usage for each task.

13. The computer-readable storage medium of claim 12, wherein the method further comprises:

performing additional generational garbage-collection operations on the shared heap;

wherein the total memory used by the task is split across memory regions associated with different garbage-collection runs; and maintaining a set of per-task memory counters, wherein a memory counter stores the amount of memory used by the task's allocated objects in a memory region that has been compacted by a garbage-collection run.

14. The computer-readable storage medium of claim 9, wherein the tasks run on a multi-processor system.

15. The computer-readable storage medium of claim 9, wherein the shared heap is located within a memory-constrained computing device.

16. The computer-readable storage medium of claim 9, wherein the shared heap is located within a platform-independent virtual machine.

17. An apparatus for tracking memory usage of tasks in a shared heap, comprising:

a garbage-collection mechanism configured to perform a full garbage-collection operation on the shared heap, during which a base memory usage is determined for a task;

a maintenance mechanism configured to maintain a memory allocation point for the shared heap, wherein the memory allocation point indicates a next location from which memory will be allocated to tasks;

wherein the maintenance mechanism is further configured to advance the memory allocation point as memory is allocated for tasks;

wherein the maintenance mechanism is further configured to, after a task is switched in during a task context-switch, remember a value associated with the memory allocation point as an initial allocation point;

a sampling mechanism that, during execution of the task, is configured to periodically estimate an amount of newly allocated memory for the task by calculating an interval between the initial allocation point and a subsequent allocation point for the shared heap, where the subsequent allocation point is associated with a subsequent location of the advancing memory allocation point;

a combination mechanism configured to combine the base memory usage and the estimate of newly allocated memory to determine an estimate of current memory usage for the task;

an estimation mechanism configured to use the estimate of current memory usage to determine whether the task is likely to be violating a memory quota; and a triggering mechanism configured to trigger a remedial action when the task violates the memory quota;

wherein the maintenance mechanism is further configured to remember the current location of the advancing memory allocation point as an initial allocation point for a subsequent task after the task has been switched out during a task context-switch and the subsequent task is switched in; and wherein the current memory usage is estimated for the task at a finer time granularity than at every full and/or generational garbage-collection operation.

* * * * *